(12) United States Patent
Erickson

(10) Patent No.: US 9,491,130 B1
(45) Date of Patent: Nov. 8, 2016

(54) SYSTEM AND METHOD FOR PROVIDING LOCATION BASED ONE-TO-ONE COMMUNICATION

(71) Applicant: Amie Erickson, Elburn, IL (US)

(72) Inventor: Amie Erickson, Elburn, IL (US)

( * ) Notice: Subject to any disclaimer, the term of this patent is extended or adjusted under 35 U.S.C. 154(b) by 0 days.

(21) Appl. No.: 14/454,933

(22) Filed: Aug. 8, 2014

Related U.S. Application Data

(60) Provisional application No. 61/863,667, filed on Aug. 8, 2013.

(51) Int. Cl.
*H04W 4/12* (2009.01)
*H04L 12/58* (2006.01)
*H04W 4/02* (2009.01)

(52) U.S. Cl.
CPC .............. *H04L 51/20* (2013.01); *H04W 4/023* (2013.01); *H04W 4/12* (2013.01)

(58) Field of Classification Search
CPC ........ H04W 4/12; H04W 4/023; H04L 51/20
USPC ........................................................ 455/466
See application file for complete search history.

(56) References Cited

U.S. PATENT DOCUMENTS

| 8,521,185 | B2 * | 8/2013 | Hymes | 455/456.3 |
| 2003/0067908 | A1 * | 4/2003 | Mattaway et al. | 370/352 |
| 2010/0056173 | A1 * | 3/2010 | Bloom | H04W 4/02 455/456.1 |
| 2010/0056183 | A1 | 3/2010 | Oh | |

FOREIGN PATENT DOCUMENTS

EP  2144396  1/2010

OTHER PUBLICATIONS

Google Places API, Place Search, https://developers.google.com/places/documentation/search, May 23, 2013.

* cited by examiner

*Primary Examiner* — Michael Neff
(74) *Attorney, Agent, or Firm* — Depeng Bi; Law Offices of Konrad Sherinian

(57) ABSTRACT

A system for providing location based one-to-one text chat between users includes a server and a plurality of mobile communication devices that are equipped with GPS receivers and used by the users. The users identify themselves to each other using their respective visual descriptions. When located in a close proximity or a same facility, one user invites another user for a text chat. The chat session is terminated when one of the users leaves the facility or moves beyond certain distance from the other user.

20 Claims, 19 Drawing Sheets

100

SYSTEM AND METHOD FOR PROVIDING LOCATION BASED ONE-TO-ONE COMMUNICATION

CROSS REFERENCE TO RELATED APPLICATIONS

This application claims the benefit and priority of U.S. Patent Application No. 61/863,667, entitled "SYSTEM AND METHOD FOR PROVIDING LOCATION BASED ONE-TO-ONE COMMUNICATION," filed Aug. 8, 2013, which is hereby incorporated in its entirety.

FIELD OF THE DISCLOSURE

The present disclosure relates to a one-to-one wireless communication system, and more particularly relates to a location based one-to-one wireless communication system. More particularly still, the present disclosure relates to a location based one-to-one text chat system.

DESCRIPTION OF BACKGROUND

The popular smartphones have made wireless communication between people convenient and affordable. For example, people can use their smartphones to make phone calls, send E-mails, exchange Short Message Service ("SMS") messages, etc. Text messages are the most popular format of SMS messages. These styles of communication require that the two communicating parties know each other's identification information, such as phone numbers. Technologies have been developed to allow anonymous people to engage in one-to-one communications. For the purpose of protecting privacy and personal safety, the anonymous communication systems are designed to keep the participating parties anonymous to each other.

However, in certain cases, people desire to chat with each other when they do not know each other's identity and are located with a close proximity. For example, two people sitting in the same Starbucks coffee store may desire to engage in a one-to-one text chat using their smartphones while they have the visual of each other, but not the identification of each other.

Accordingly, there is a need for a system and method for providing location based one-to-one text chat between anonymous persons who are in close proximity and have the visual of each other.

OBJECTS OF THE DISCLOSED SYSTEM, METHOD, AND APPARATUS

An object of this disclosure is to provide a one-to-one communication system;

An object of this disclosure is to provide a location based one-to-one communication system;

An object of this disclosure is to provide a location based one-to-one text chat system;

An object of this disclosure is to provide a one-to-one text chat system for persons within a close proximity;

An object of this disclosure is to provide a one-to-one text chat system for persons with the visual of each other;

An object of this disclosure is to provide a one-to-one text chat system for persons who provide their visual identification;

Other advantages of this disclosure will be clear to a person of ordinary skill in the art. It should be understood, however, that a system, method, or apparatus could practice the disclosure while not achieving all of the enumerated advantages, and that the protected disclosure is defined by the claims.

SUMMARY OF THE DISCLOSURE

Generally speaking, pursuant to the various embodiments, the present disclosure provides a system for providing location based one-to-one text chat between users. The system includes a server operatively coupled to a wide area network, a database coupled to the server, and a plurality of mobile communication devices. Each of the plurality of mobile communication devices includes a GPS receiver. The plurality of mobile communication devices communicate with the server over a wireless network and the wide area network. Users of the plurality of mobile communication devices identify themselves to each other using their respective visual descriptions. When located in a close proximity or a same facility, one user invites another user for a text chat using their mobile communication devices. A server software application running on the server maintains a chat session for a chat between the two users. The chat session is terminated when one of the users leaves the facility or moves beyond certain distance from the other user.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views. Elements in the drawings are not necessarily drawn to scale. Additionally, the detailed description and drawings do not necessarily require the order the elements are illustrated. Moreover, for simplicity and clarity of illustration, common and well-understood elements to those skilled in the art may not be depicted for simplicity and clarity of illustration.

DETAILED DESCRIPTION OF THE
ILLUSTRATED EMBODIMENT

Figure 1:
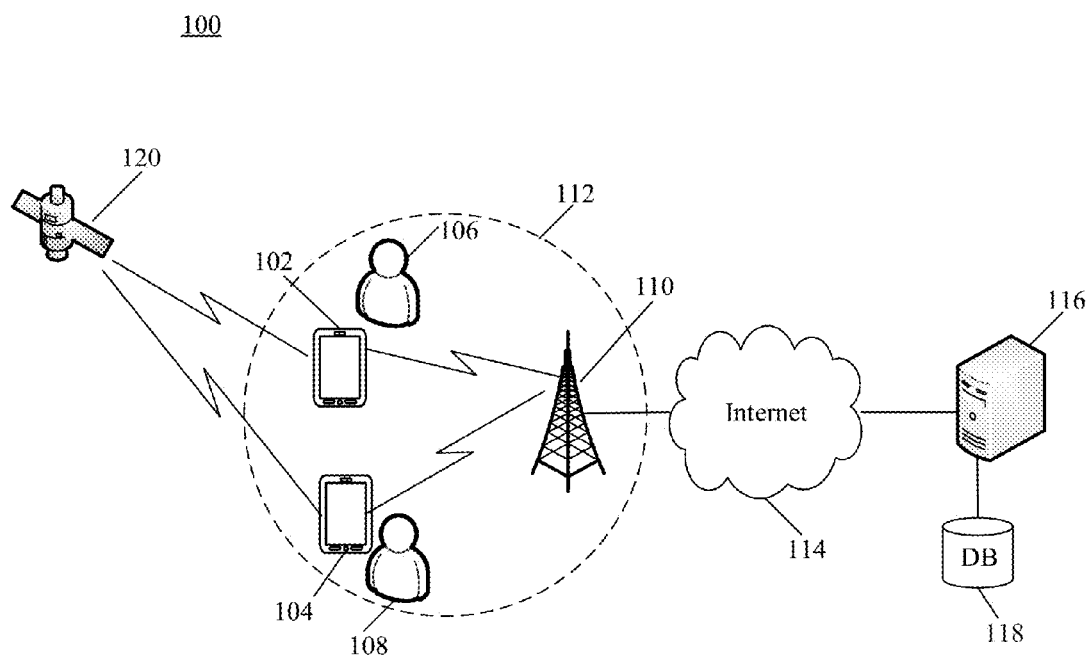
FIG. 1 is a simplified block diagram of a location based one-to-one communication system in accordance with this disclosure.
Figure 2:
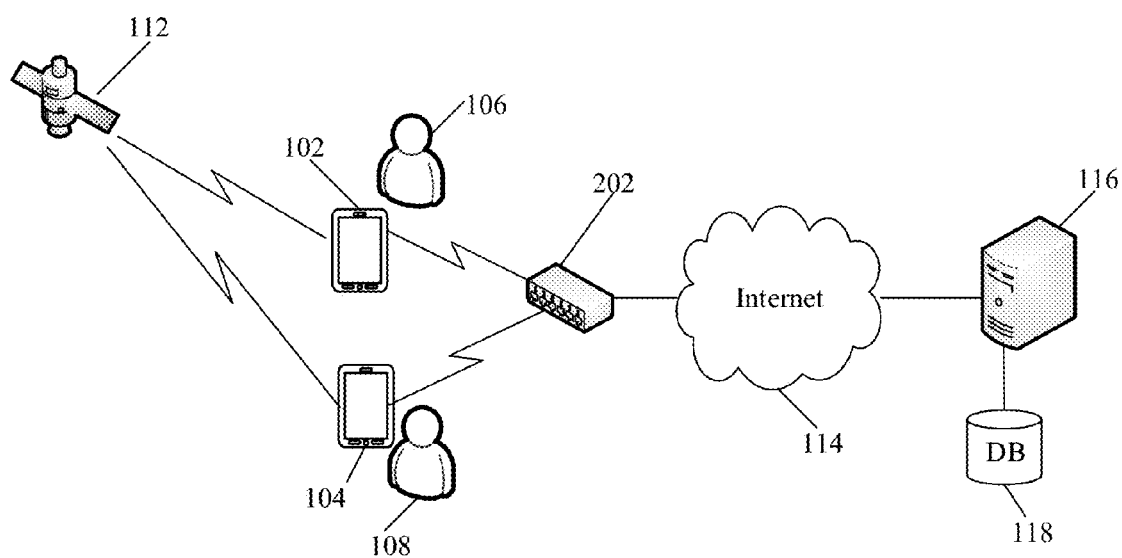
FIG. 2 is a simplified block diagram of a location based one-to-one communication system in accordance with this disclosure.
Figure 9:
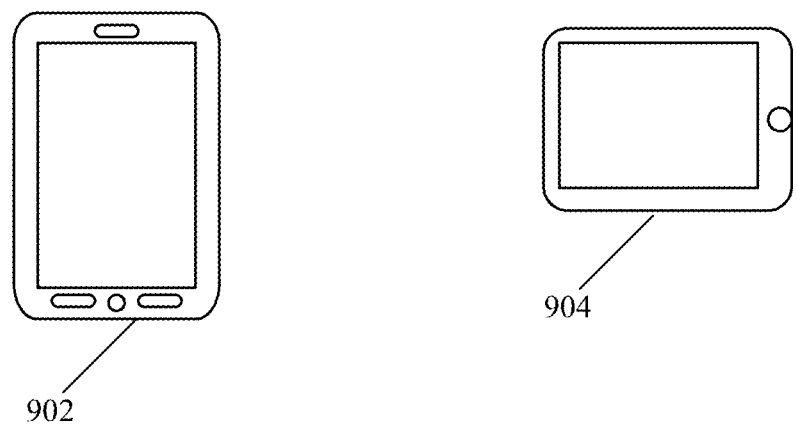
FIG. 9 is a perspective view of mobile communication devices that can be used by a customer of a facility in accordance with this disclosure.

This disclosure addresses a location based one-to-one (or 1-1 for short) communication system, such as text chat systems shown in FIGS. 1 and 2. Turning to the Figures and to FIG. 1 in particular, a simplified block diagram of a text chat system is shown and indicated at 100. The system 100 includes two mobile communication devices 102 and 104, a wireless network 112 with a radio tower 110 (such as a base station), a plurality of communication satellites 120, a wide area network 114, a server 116 and a database 118 operatively coupled to the server 116. The server 116 includes a processor, a network interface and some amount of memory. The mobile communication devices (or mobile devices for short) 102,104 can be, for example, smartphones and tablet computers as pictured in FIG. 9. iPhone and iPAD devices are popular smartphones and tablet computers currently available on the market.

Equipped with Global Positioning System ("GPS") receivers, the devices 102,104 receive satellite signals from three or more satellites 120. Based on, for example, the differences of arrival times of the satellite signals, a GPS software program running on the devices 102,104 determines the GPS locations of the respective mobile devices. A GPS location usually includes a latitude and a longitude. Over the wireless cellular network 112 and the wide area network (such as the Internet) 114, the devices 102,104 send their respective GPS locations to the server 116 which determines whether the two devices 102,104 are in a very close proximity, such as thirty feet. Alternatively, the server 116 determines whether the two devices 102,104 are in a same facility, such as a Starbucks coffee store, McDonald restaurant or a community library. The proximity between the devices 102 and 104 indicates the proximity between their respective users 106 and 108. The GPS locations of the devices 102,104 indicate the physical locations of the users 106,108 respectively.

Where the devices 102 and 104 are in the same facility, the server 116 provides the information of the user 108 to the user 106, and vice versa. Usually, the users 106 and 108 do not know each other, or at least one of them does not know the other party. As used herein, knowing a person means knowing his name, address, job, a person of his family, or something else. To allow the users 106,108, who do not know each other, to engage in a 1-1 text chat using the devices 102,104, the system 100 requires the users 106,108 to provide a visual description of themselves. A visual description (also referred to herein as visual identification) of a person can be a description of where he sits, what he wears, what he looks like, his physical features, etc. For example, "the red cap guy by the door," "I'm the girl with long black hair next to the window," "Hair colour: Brown, Eye colour: Blue, Height: 6 feet," "Blue jeans, red T-shirt, brunette," and "blue baseball cap and yellow jacket" are illustrative visual identifications.

When the user 106 desires to have a 1-1 chat with the user 108, the user 106 sends an invitation or greeting to the user 108 for a chat, such as a text chat using the devices 102,104. The invitation includes a visual identification of the user 106. Alternatively, the visual identification of the user 106 and other users in the same facility or a close range is provided to the user 108 once the user 108 signs into the system 100. Based on the visual identification of the user 106, the user 108 identifies the user 106 and determines whether to chat with the user 106 or not. The user 108 may rejects or accepts the invitation. Where he accepts the invitation, he sends a message back to the user 106 and starts the chatting. Accordingly, a chatting session is created. The server 116 may maintain and track the chat session in order to receive and forwarding messages between the users 106 and 108.

In one implementation, the chatting messages are text messages. In a further implementation, a chatting message may include photographs, sound, voice, video, or other formats of media. Additionally, a user may engage in multiple chatting sessions at the same time. A chatting session between the users 106 and 108 can be terminated by a number of methods. For example, when the user 106 walks out the facility, the chatting session is automatically terminated. As an additional example, the user 106 may proactively terminates the session by pressing a software button of the chatting software application running on the device 102. As a further example still, the server 116 may terminate the session when there is no message exchange between the users 106,108 for a predetermined amount of time, such as thirty minutes.

Referring to FIG. 2, an alternate location based 1-1 communication system 200 is shown. The system 200 includes a wireless network access point 202, such as a WiFi router. Over the WiFi network empowered by the access point 202, the devices 102,104 communicate with the server 116.

Figure 3:
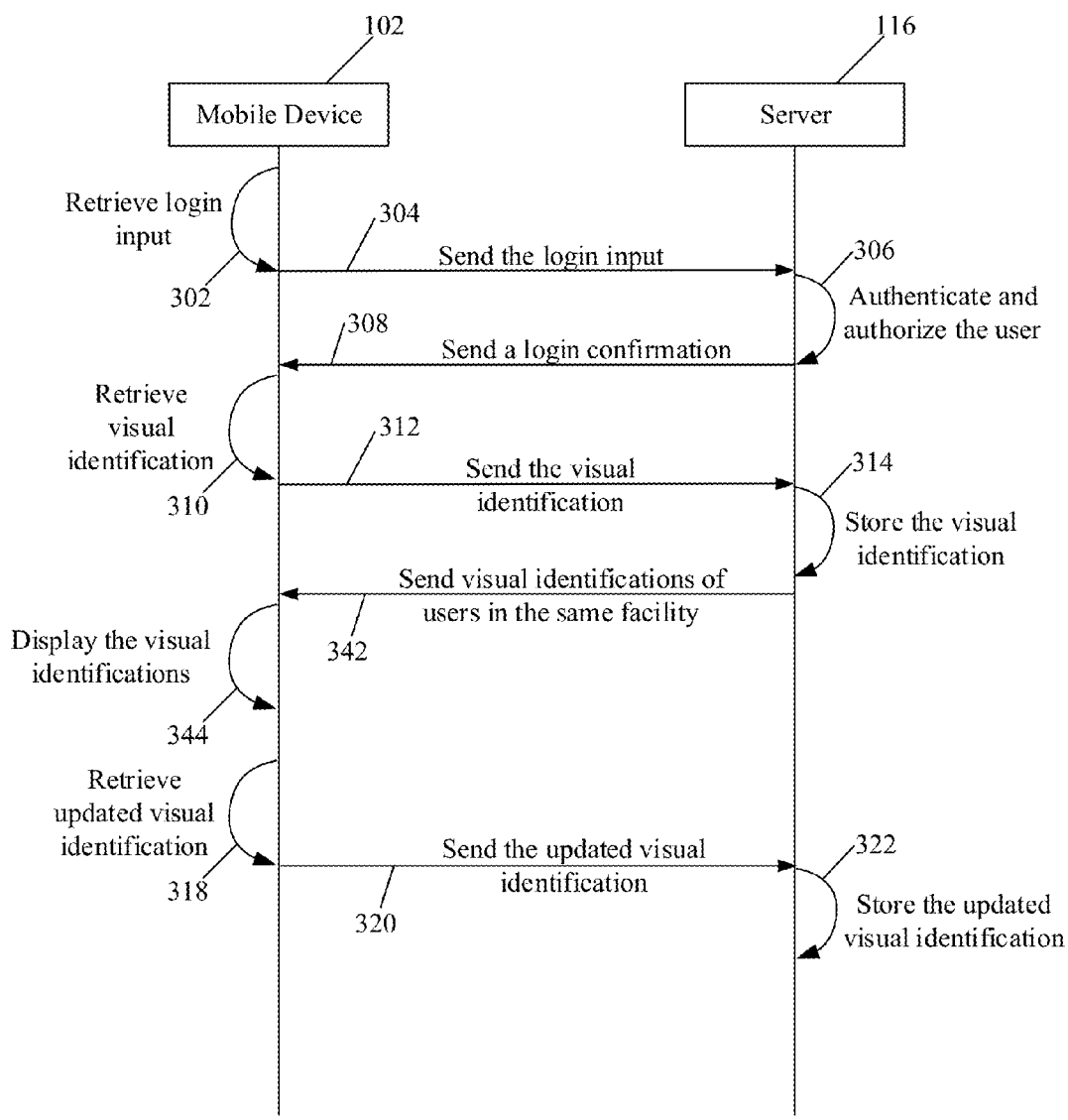
FIG. 3 is a sequence diagram depicting a process by which a mobile communication device provides login input and visual identification to a server in accordance with this disclosure.

Referring now to FIG. 3, a sequence diagram depicting a process by which, using the device 102, the user 106 logs in the system 100 and provides his visual identification to the server 116 is shown and indicated at 300. A mobile software application running on the device 102 and a server software application running on the server 116 allow the user 106 to log in the system 100 and provide his visual identification. The mobile software application can be a web browser or a proprietary software application. In one implementation, the mobile software application is a software program written in Objective-C computer programming language. The mobile software application runs in iOS operating system within iPhone smartphones. Additionally, the mobile software application is deployed in Apple, Inc.'s App Store for people to download and install.

Moreover, in this illustrative implementation, the server software application is written in PHP 5.0 computer programming language. Additionally, the server software application provides one or more web services to be accessed and called by the mobile software application. The server software application utilizes Push Notification technology (a push technology developed by Apple, Inc.) to communicate with the mobile software application. The underlying communication protocol between the mobile software application and the server software application, in the illustrative implementation, is Extensible Messaging and Presence Protocol ("XMPP").

Figure 11:
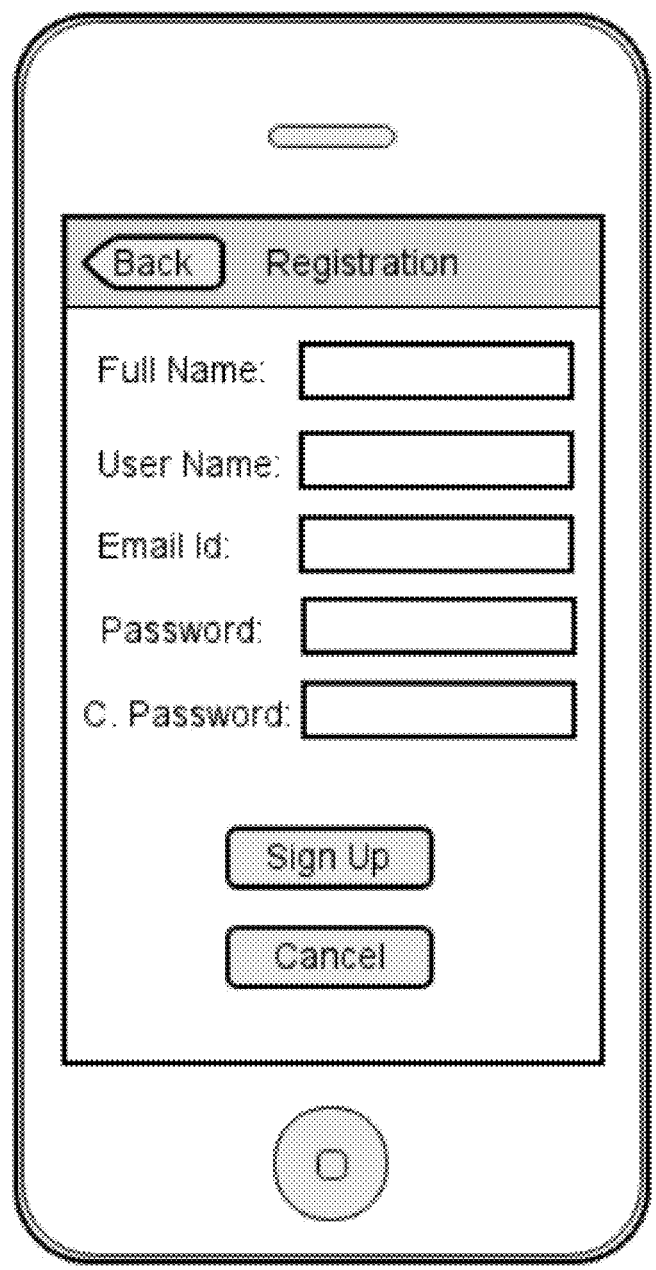
FIG. 11 is a sample display of a registration screen in accordance with this disclosure.
Figure 12:
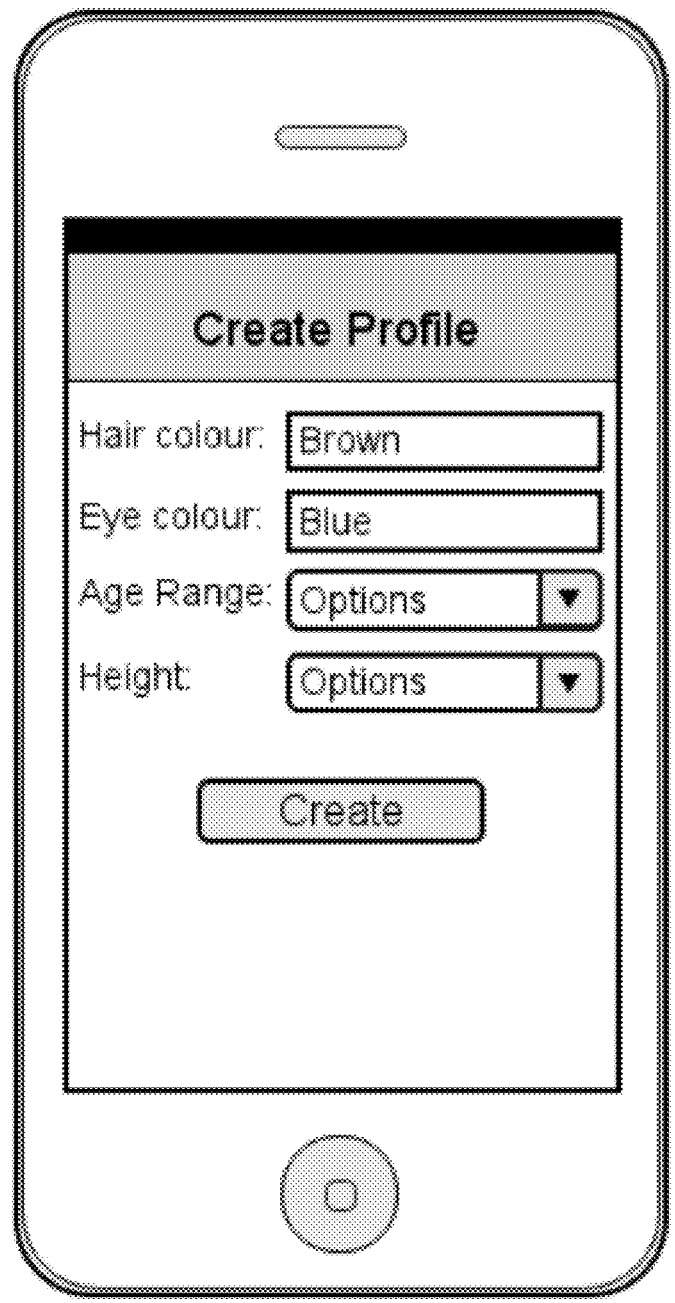
FIG. 12 is a sample display of a profile creation screen in accordance with this disclosure.

In one implementation, the mobile software application allows the users 106,108 to register with the system 100. During the registration process, the users 106,108 provide their profile information, such as name and address, and create their user name (such Email address) and password. A sample display of the registration screen is shown in FIG. 11; and a sample display of the profile creation screen is shown in FIG. 12. The profile of a user indicates a visual identification of the user. The registration may also display a Terms of Use form of the system 100. The users 106,108 then have to confirm their acceptance of the Terms of Use to continue with the registration process. In a further implementation, the users 106,108 are shown with one or more payment options (such as $9.99/month or $99.99/year) for using the service provided by the system 100. Once the users 106,108 select an option, they are required to enter their payment information, such as credit card number. Additionally, during the registration process, a unique user identifier is assigned to each of the users 106,108.

Figure 10:
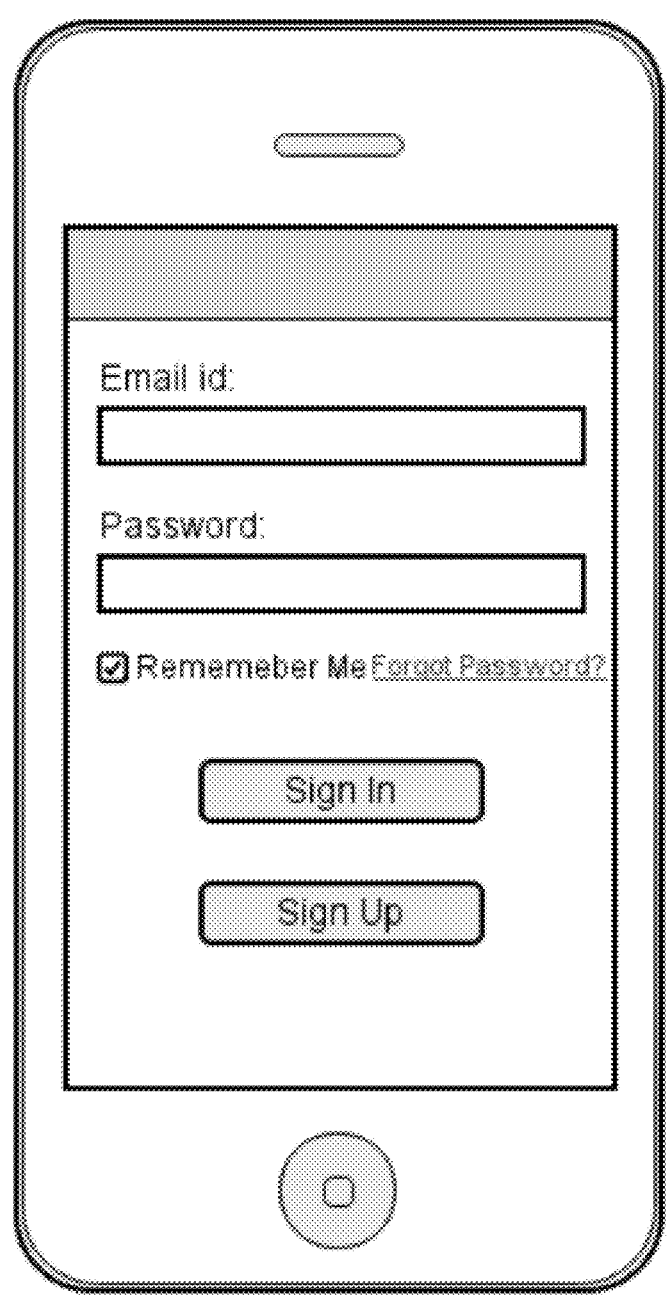
FIG. 10 is a sample display of a login screen in accordance with this disclosure.

Each time the users 106,108 use the system 100, they may be required to log in first. The login screen presents user name and password fields for the users 106,108 to entered their login credentials. A sample display of the login screen is shown in FIG. 10. At 302, after the user 106 enters his user name and password (collectively referred to herein as login input and login credentials), and presses a login button, the mobile software application retrieves the login input. At 304, the mobile software application sends the login input to the server software application by, for example, accessing a web service provided by the server software application.

At 306, the server software application receives the login input, authenticates the login credential, and authorizes the user 106 to access the system 100. When the authentication and/or authorization fails, the user 106 may be give a number of retries. When the authentication and authorization are successful, at 308, the server software application sends a confirmation to the mobile software application. Thereafter, using the mobile software application, the user 106 enters his visual identification using, for example, the screen of FIG. 12. At 310, the mobile software application retrieves the visual identification entered by the user 106. At 312, the mobile software application sends the visual identification to the server software application. At 314, the server software application retrieves the visual identification, and stores it in the database 118. In one implementation, the database 118 is relational database, such as a MySQL or Oracle database. The server software application may optionally maintain a copy of the visual identification in memory for quick access.

Figure 18:
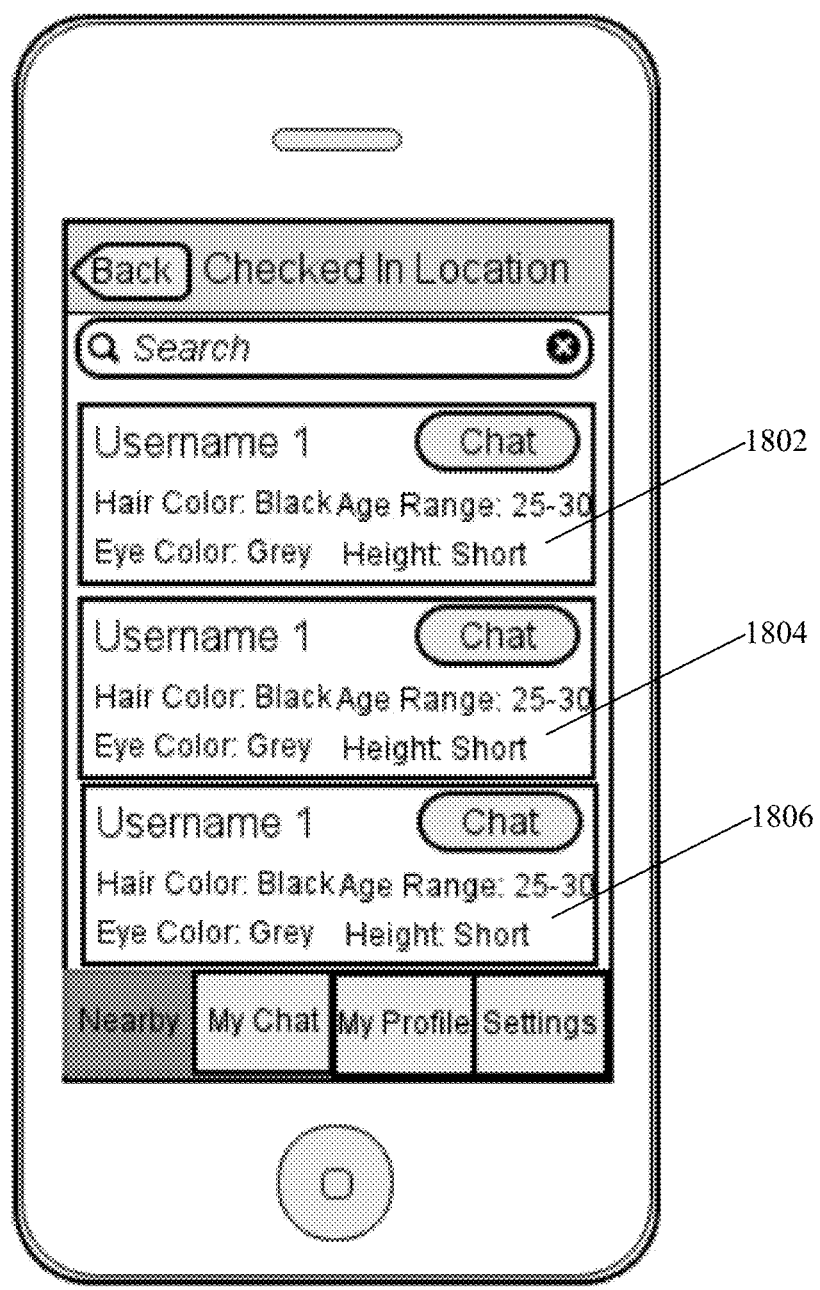
FIG. 18 is a sample display of a list of live text chat screen in accordance with this disclosure.

In a further implementation, at 342, the server software application sends the visual identifications of users in the same facility as or close to the user 106. At 344, the mobile software application displays the visual identifications of the nearby users on a screen of the device 102. A sample screen of the displayed nearby users is shown in FIG. 18. In FIG. 18, three illustrative visual identifications 1802, 1804 and 1806 indicating three users are shown. It should be noted that the user 106 is allowed to update his visual identification anytime he chooses. For example, the user 106 wears different clothing on two different days. As an additional example, when he leaves a Starbucks coffee store and enters into a local bar, his visual identification regarding where he sits will be different. Accordingly, using the mobile software application, he enters a different visual description about himself. At 318, the mobile software application retrieves the updated visual identification. At 320, the mobile software application sends the updated visual identification to the server software application. At 322, the server software application retrieves the updated visual identification, and stores it in the database 118 and/or memory. In a different embodiment, the visual identification is maintained only in memory, not in the database 118.

Figure 4:
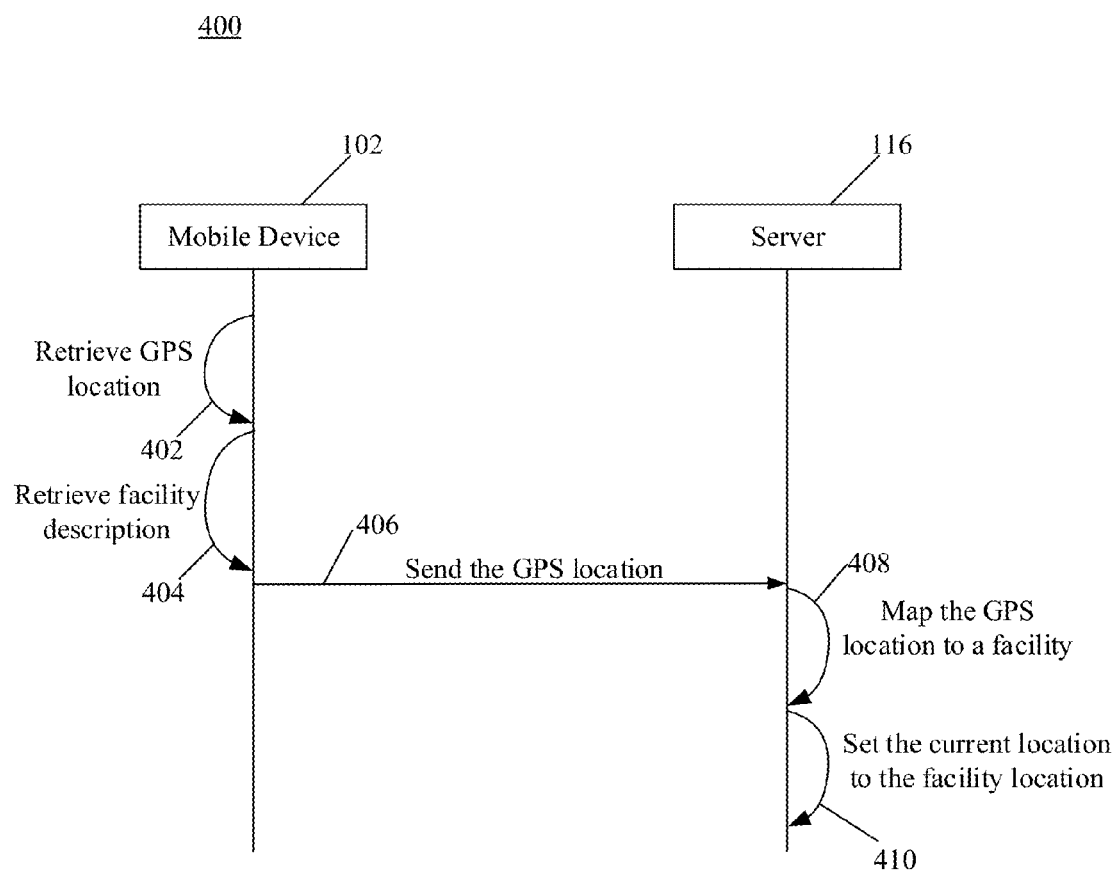
FIG. 4 is a sequence diagram depicting a process by which a mobile communication device provides its GPS location to a server in accordance with this disclosure.

Turning to FIG. 4, a process by which the mobile device 102 provides the GPS location of the user 106 to the system 100 is shown and indicated at 400. In one implementation, the mobile software application periodically queries the GPS location of the device 102. In a more efficient way, the mobile software application registers a GPS location listener with the underlying GPS system and/or operating system (such iOS) of the device 102. Whenever the GPS location of the device 102 is changed, the mobile software application is notified of the new GPS location. To further optimize the system efficiency and performance, the mobile software application specifies a measurable distance threshold of GPS location change for the GPS location change notifications. For example, where the distance threshold is forty feet, the mobile software application is notified of a new GPS location only if new GPS location is forty feet or more from the previously notified GPS location. To provide an initial GPS location, the mobile software application can be notified of a GPS location when the listener is registered. Moreover, the mobile software application may query the GPS system of the device 102 when the user 106 logs in, updates his visual identification, etc.

At 402, the mobile software application obtains and retrieves a GPS location. In a further implementation, the user 106 types in a facility description of the place or facility where he is currently at. The facility description includes one or more keywords indicating the type or other characteristics of the facility. For example, he may enter "restaurant" or "library." At 404, the mobile software application retrieves the facility description. At 406, the mobile software application sends the GPS location, and optionally the facility description, to the server software application. At 408, the server software application maps the GPS location and the facility description keywords, if provided, to a specific facility, such as a Starbucks coffee store. In one implementation, the mapping is performed by calling Google Places APIs (Application Programming Interfaces), a screenshot of which is hereby incorporated in its entirety. At 410, the server software application sets the current location of the user 106 to the facility or establishment mapped to from the GPS location.

Figure 13:
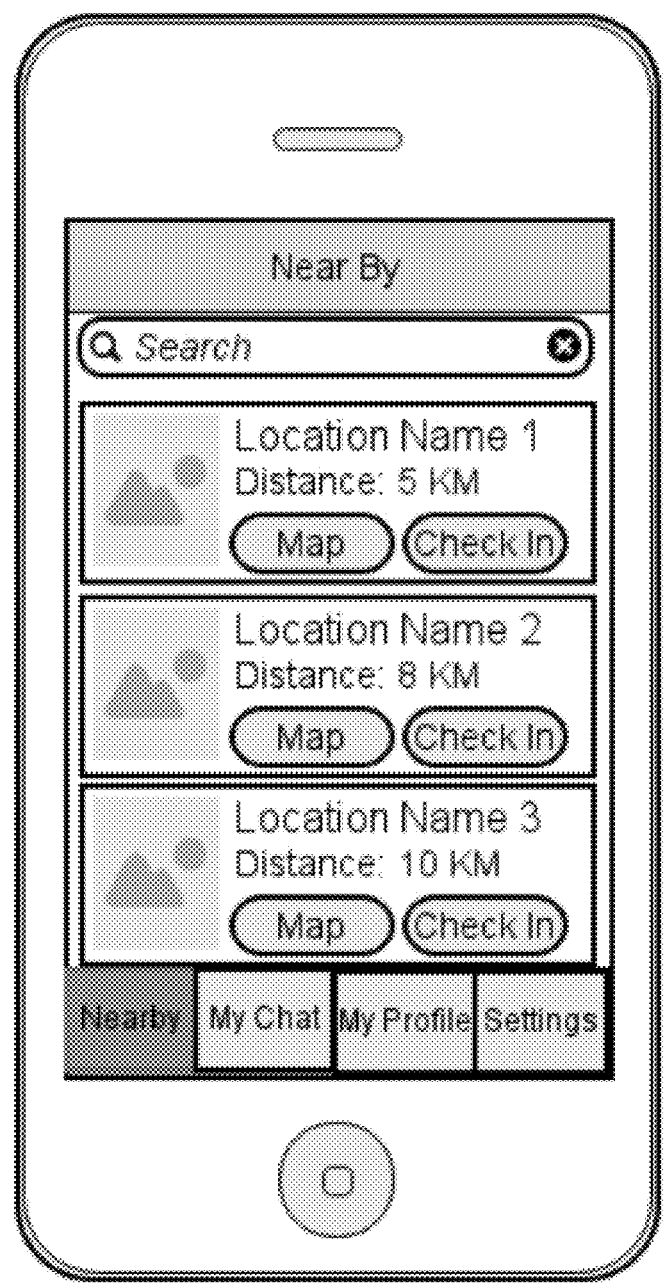
FIG. 13 is a sample display of a nearby facility screen in accordance with this disclosure.
Figure 14:
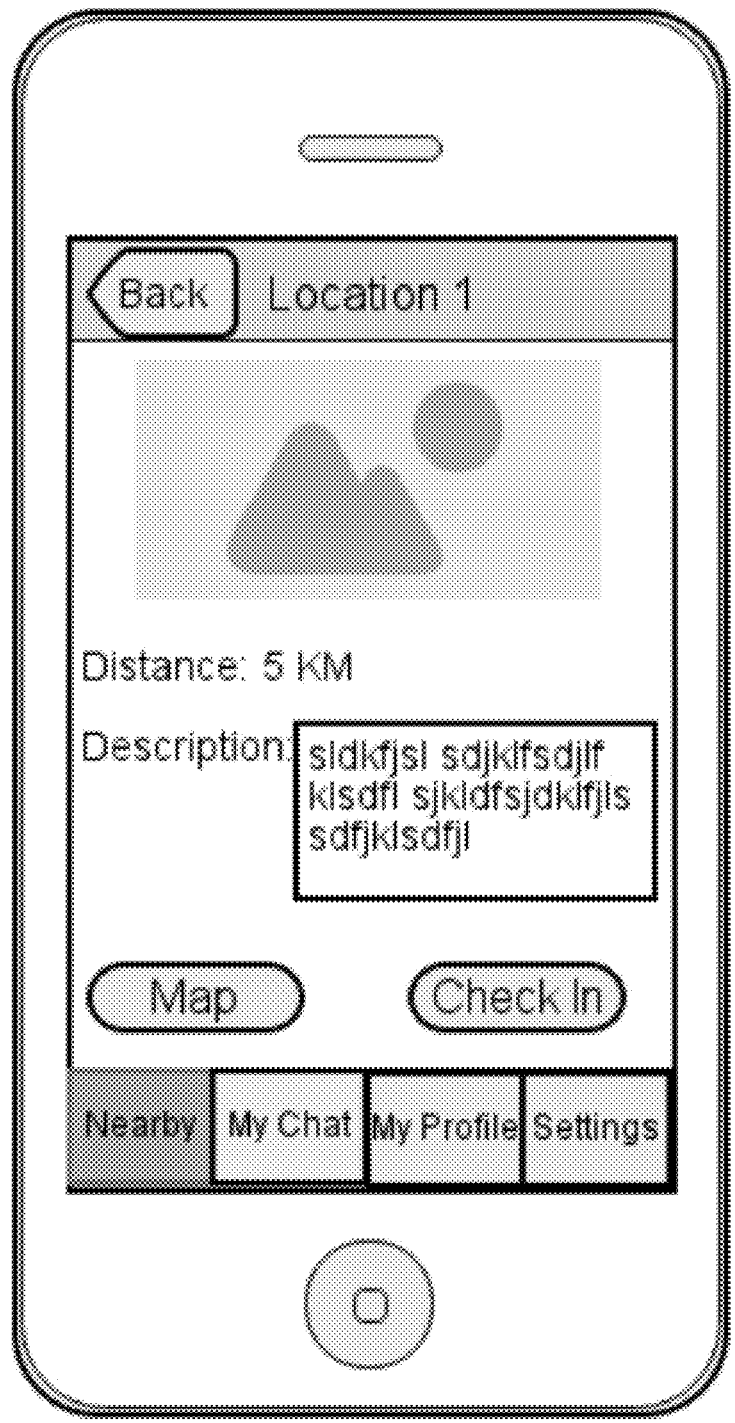
FIG. 14 is a sample display of a facility details screen in accordance with this disclosure.
Figure 15:
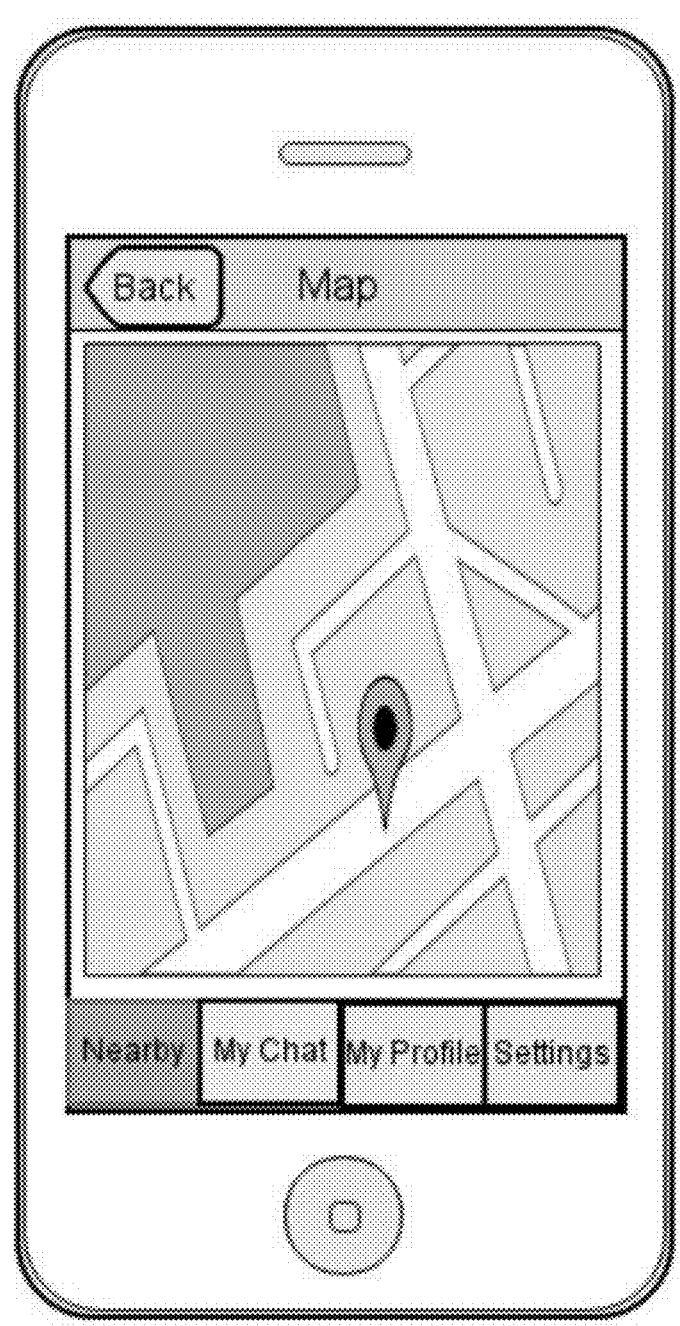
FIG. 15 is a sample display of a map screen in accordance with this disclosure.

Alternatively, the server software application provides a list of facilities that are in a close proximity of the GPS location to the mobile software application, which displays the list to the user 106. A sample display of the list of facilities screen is shown in FIG. 13. Upon selection of one facility in the list, the details of the selected facility are displayed to the user 106. A sample display of the facility details screen is shown in FIG. 14. The details screen provides a Map button, clicking of which causes a map to be displayed on the mobile device 102. A sample display of the map screen is shown in FIG. 15.

Figure 5:
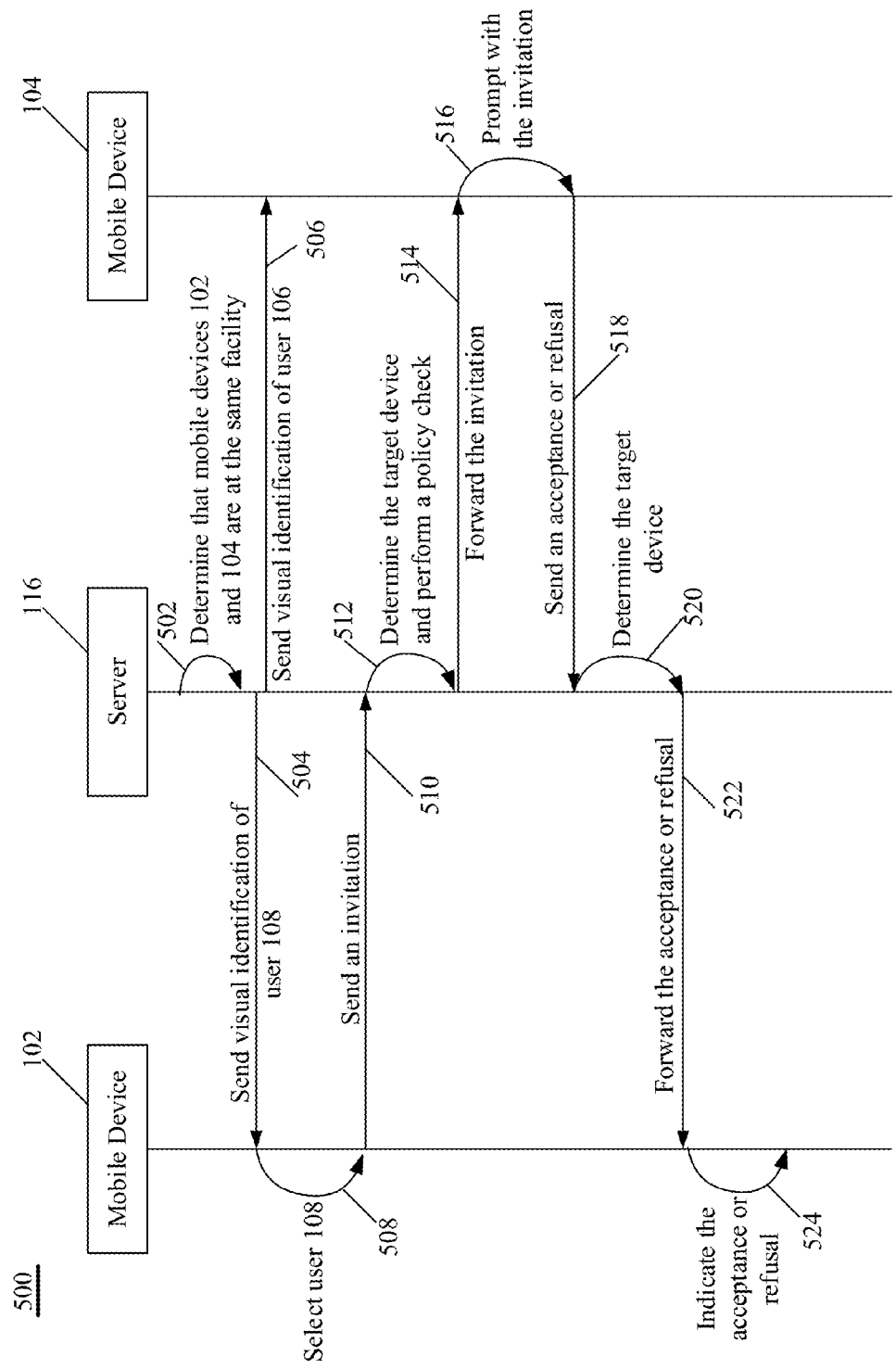
FIG. 5 is a sequence diagram depicting a process by which a location based one-to-one text chat session is initiated and set up in accordance with this disclosure.

Referring to FIG. 5, a sequence diagram depicting a process 500 by which a location based one-to-one text chat session is initiated and set up. At 502, based on the current locations of the users 106,108, the server software application running on the server 116 determines that the mobile devices 102,104 are at the same facility. In one implementation, such determination is based on the facilities where the users 102,104 are currently located. Alternatively, such determination is based on the physical distance between the current GPS locations of the users 102,104. When the server software application determines that the users 106,108 are at the same facility, at 504, the server software application sends the visual identification of the user 108 to the device 102. Similarly, at 506, the server software application sends the visual identification of the user 106 to the device 104.

Figure 17:
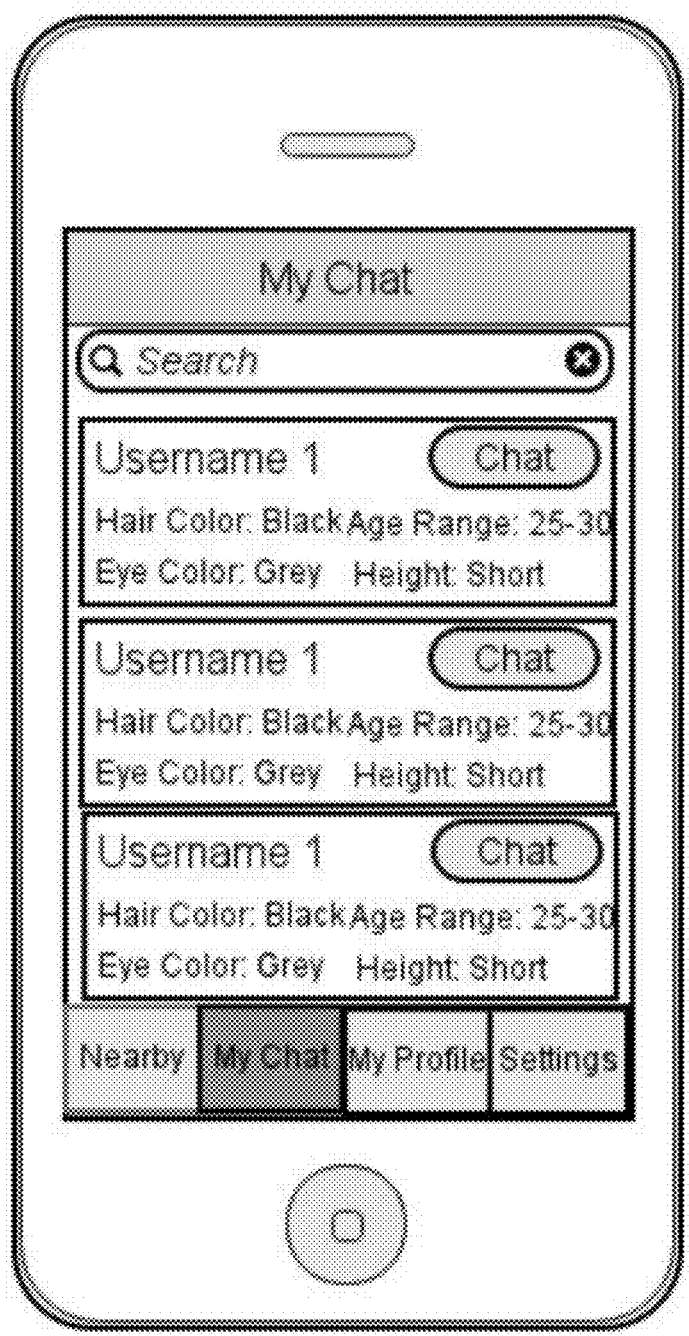
FIG. 17 is a sample display of a text chat screen in accordance with this disclosure.

The mobile software application running on the mobile device 102 retrieves the visual identification of the user 108 and other users of the system 100. The mobile software application displays the list of visual identifications on the user 106. Sample displays of the visual identifications are shown in FIGS. 17 and 18, which allow the users 106 and 108 to select someone to chat with based on her/his visual identification. To associate each visual identification to a specific user, the user identifier of the user 108 is also sent at 504. When the user 106 chooses one visual identification of, for example, the user 108. At 508, the mobile software application selects the user 108 by his user identifier. At 510, the mobile software application sends an invitation for a 1-1 text chat. The invitation is associated with the user identifiers of the users 106 and 108. At 512, the server software application determines that the target device is the device 104. Moreover, at 512, the server software application performs a policy check to determine whether a 1-1 text chat between the users 106,108 should be allowed. The policy check can also be performed before elements 504 and 506 are performed. The creation of the policy is further illustrated by reference to FIG. 8.

Figure 8:
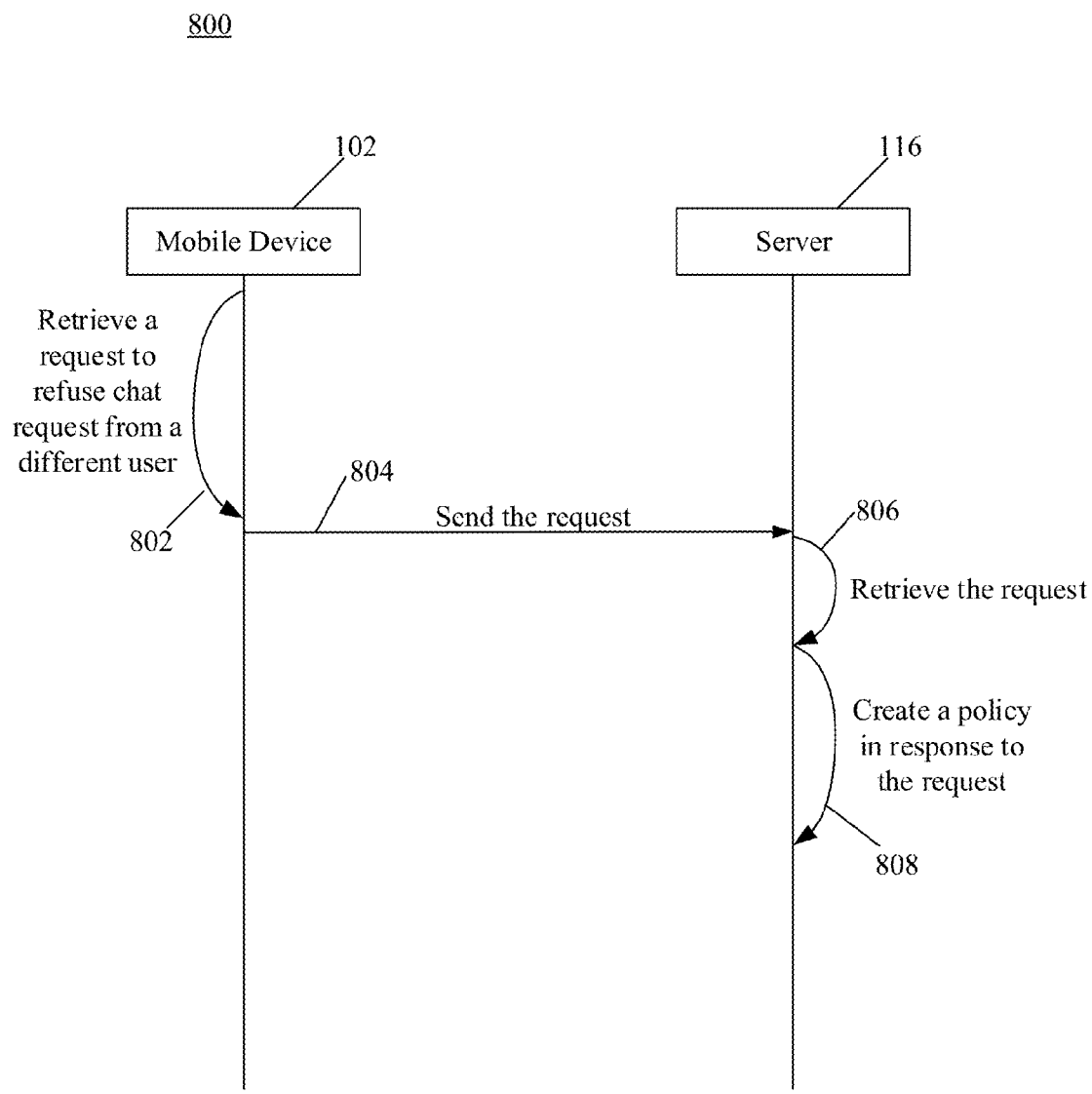
FIG. 8 is a sequence diagram depicting a process by which a policy is created between two users in accordance with this disclosure.

Turning now FIG. 8, when a user (such as the user 106) desires not to chat with another user (such as the user 108) anymore, he selects the user 108 and presses a button of the mobile software application. Consequently, at 802, the mobile software application retrieves the request. At 804, the mobile software application sends the request to the server 116. The request is associated with the user identifiers of the users 106,108. At 806, the server software application retrieves the request. At 808, the server software application creates a policy in response to the request. For example, the policy is represented by a data structure that includes the user identifiers of the users 106,108, the type of the policy, duration of the policy, etc.

Turning back to FIG. 5, for example, if the user 108 has indicated that he does not want to chat with the user 106 forever or for a specified amount of time, the invitation, sent at 510, should be denied, and a notification may be sent to the user 106. Where the user 106 is allowed to chat with the user 108, at 514, using Push Notification technology, the server software application sends the invitation to the device 104. At 516, the mobile software application running on the device 104 retrieves the invitation and notifies the user 108 of the invitation. In one implementation, the user 108 presses the notification on the touch screen of the device 104. Accordingly, the invitation is displayed on the device 104 as, for example, a notification message or a graphical indicator. Alternatively, a sound is played to indicate the invitation. Moreover, the visual identification of the user 106 is also displayed to the user 106.

The user 108 can accept or refuse the invitation. At 518, the mobile software application sends the acceptance or refusal to the server 116. At 520, the server software application determines the target device of the acceptance or refusal. If the user 108 has accepted the invitation, the server software application creates a chat session for the users 106 and 108. The chat session is associated with the user identifiers of the users 106,108. Additionally, a no-activity timeout may be associated with the chat session. At 522, the server software application forwards the acceptance or refusal to the device 102. At 524, the mobile software application running on the device 102 receives the acceptance or refusal, and indicates the acceptance or refusal on a display screen of the device 102. Alternatively, the user 108 inquiries about the visual identification before she/he accepts the invitation from the user 106. The user 106 then provides her/his visual identification. The alternative process is further illustrated in FIG. 16.

Figure 6:
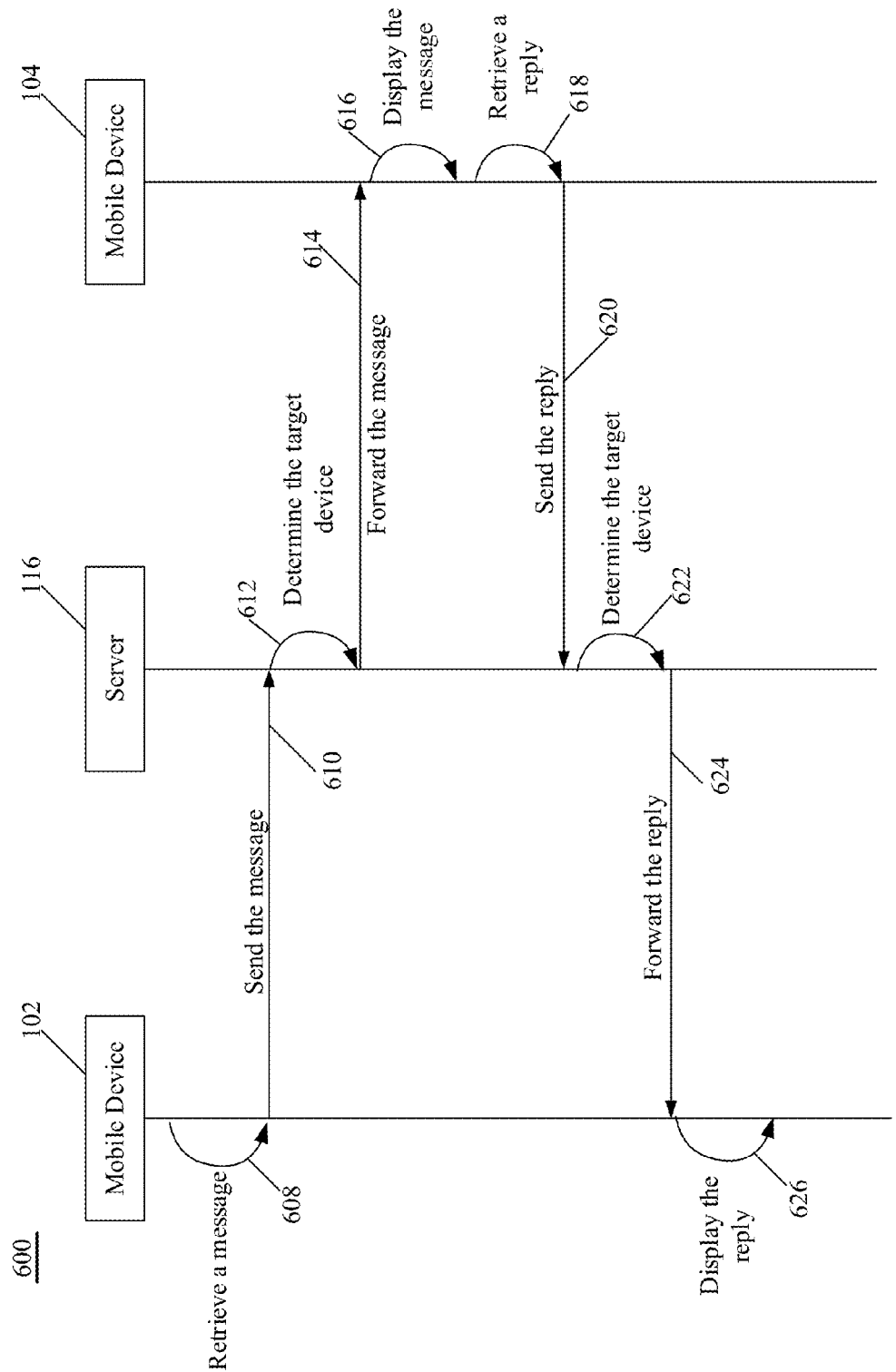
FIG. 6 is a sequence diagram depicting a process by which text messages are exchanged between two mobile devices in accordance with this disclosure.

When the invitation is accepted, the user 104 then starts to chat with the user 106. The 1-1 text chat is further illustrated by reference to FIG. 6. Referring to FIG. 6, the user 102 enters a text message in the mobile software application. At 608, the mobile software application retrieves the message. When the user 106 presses a button to send the message, at 610, the mobile software application sends the message to the server 116. It should be noted that the message is associated with user identifiers of the users 106,108. At 612, the server software application determines the target device for the message. Additionally, at 612, the server software application may perform a policy check to determine whether to forward the message to the device 104. For example, the user 108 may have indicated to the server 116 that he no longer wants to chat with the user 106. If forwarding the message is not allowed, the server software application sends a notification to the device 102. Otherwise, at 614, the server software application forwards the message to the device 104. At 616, the mobile software application retrieves the message and displays it on the screen of the device 104 to the user 108.

Figure 16:
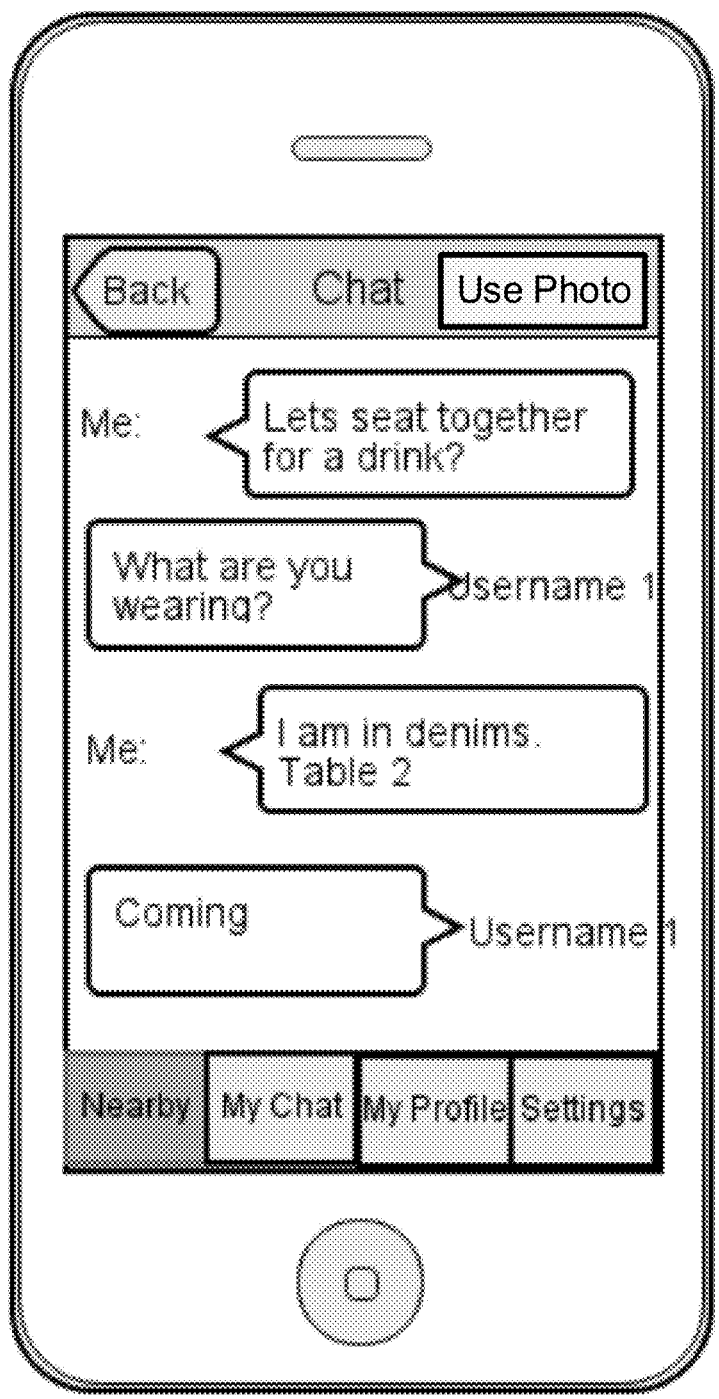
FIG. 16 is a sample display of a user list screen in accordance with this disclosure.

When the user 108 types a reply message, at 618, the mobile software application running on the device 104 retrieves the reply message. The reply message is associated with the user identifiers of the users 106,108. At 620, the mobile software application sends the reply message to the server 116. At 622, the server software application retrieves the reply message and determines the target device for the reply message. At 624, the server software application forwards the reply message to the device 102. At 626, the mobile software application retrieves the reply message and displays the reply message on the screen of the device 102 to the user 106. It should be noted that, at 612 and 622, the server software application further determines whether a chat session between the devices 102 and 104 exist. If there is not a valid and live chat session, the messages are not forwarded to the target devices. A sample display of the text chat screen is shown in FIG. 16.

Figure 7:
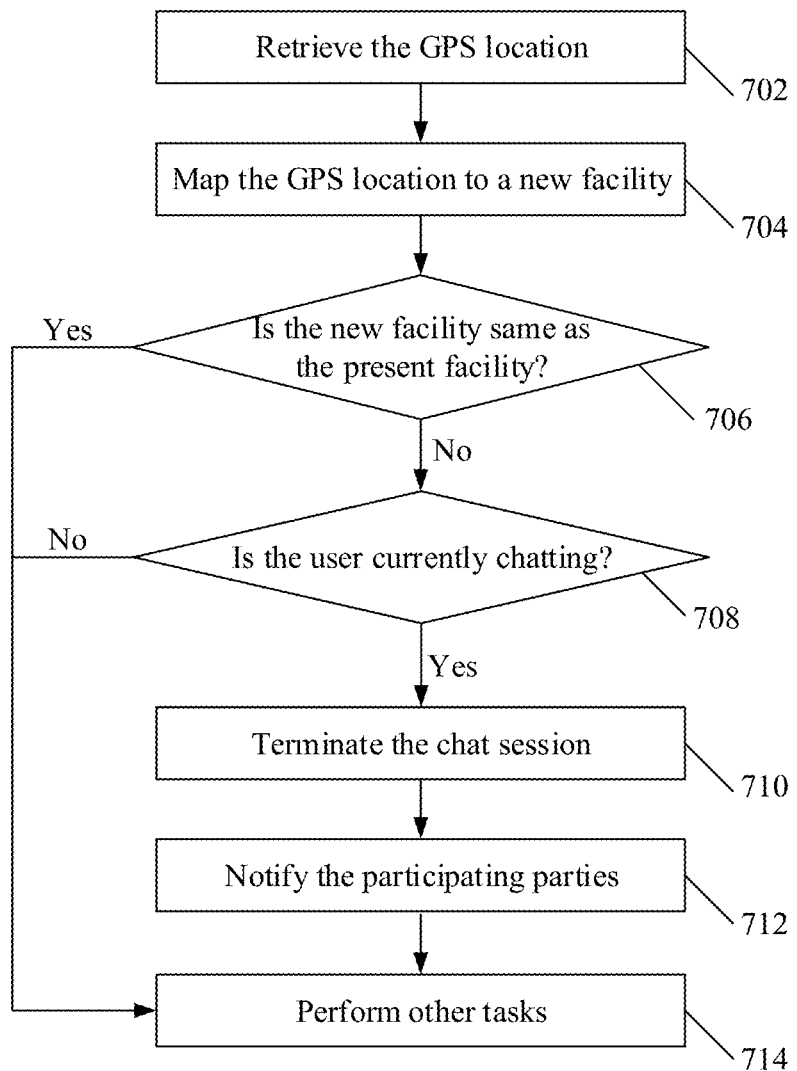
FIG. 7 is a flowchart depicting a process by which a location based one-to-one text chat session is terminated in accordance with this disclosure.

Referring to FIG. 7, a flowchart depicting a process 700 by which a location based one-to-one text chat session between the users 106 and 108 is terminated. When the user 106 leaves the facility where he chats with the user 108, the mobile software application running on the device 102 sends a new GPS location to the server 116. At 702, the server software application retrieves the GPS location. At 704, the server software application maps the GPS location to a new facility. However, it is possible that the GPS location is not mapped to a known facility. In such a case, the GPS is said to be mapped to an unknown facility.

At 706, the server software application determines whether the new facility is same as the present facility where the user 106 is leaving from. If so, at 714, the server software application performs other task. Otherwise, at 708, the server software application checks whether the user 102 is currently chatting with another user. In other words, the server software application checks whether the user 102 is currently in a chat session. If so, at 710, the server software application terminates the current chat session. At 712, the server software application notifies the participating parties of the session by sending notification message to them. Turning back to 708, if the user 106 is not currently chatting, at 714, the server software application performs other tasks.

Additionally, the chat session can be terminated by either of the users 106,108 with a press of a button of the mobile software application. Furthermore, the chat session can be terminated when there is no message exchange between the users 106,108 for certain amount of time, such as twenty five (25) minutes.

Obviously, many additional modifications and variations of the present disclosure are possible in light of the above teachings. Thus, it is to be understood that, within the scope of the appended claims, the disclosure may be practiced otherwise than is specifically described above. For example, the functions of the server 116 can be performed by more than one physical server. The more than one server can be distributed in multiple physical locations. As a further example, the database 118 stores facilities and their corresponding GPS locations. Accordingly, the server software application maps a GPS location to a facility using data stored in the database 118.

Figure 19:
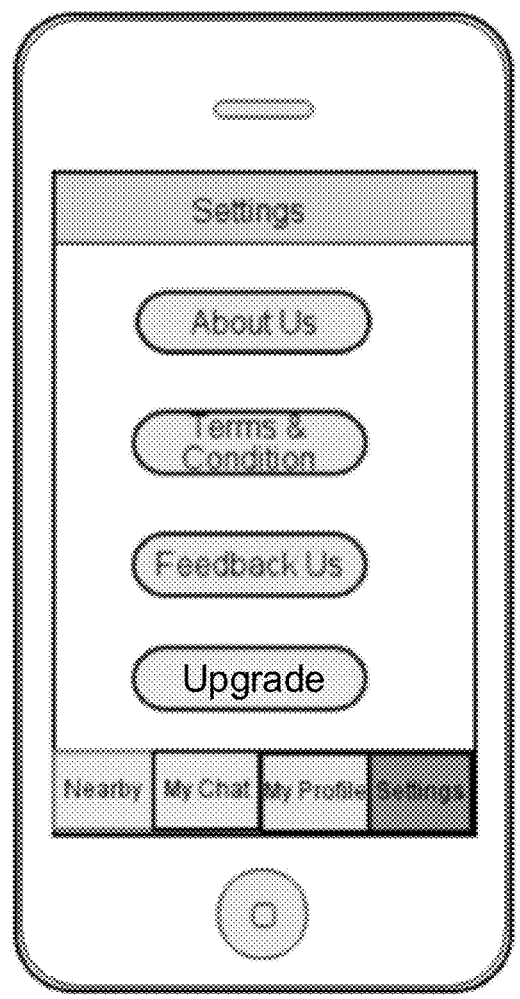
FIG. 19 is a sample display of a settings screen in accordance with this disclosure.

Moreover, the systems 100 and 200 support multiple chat sessions for each user. The mobile software application allows each of the users 106,108 to view the list of his live text chat sessions, as shown in FIG. 17. Additionally, the mobile software application allows each of the users 106, 108 to view the list of users at a certain facility or location, as shown in FIG. 18. Furthermore, the mobile software application allows each of the users 106,108 to view various types of information, such as "About Us" and "Terms & Condition," and make changes to his settings, as shown in FIG. 19.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A system for providing location based one-to-one communication, said one-to-one communication is established using visual identifications of users, the system comprising:
   i. a database;
   ii. a server having a processor, a network interface operatively coupled to said processor and a wide area network, and a server software application operating on said processor, said server having access to said database, said server adapted to communicate with a set of mobile communication devices over said wide area network, said set of mobile communication devices including a first mobile communication device and a second mobile communication device, said first mobile communication device used by a first user, said second mobile communication device used by a second user; and
   iii. wherein said server software application adapted to:
      (1) receive a first Global Positioning System (GPS) location of said first user from said first mobile communication device over said network interface;
      (2) receive a second GPS location of said second user from said second mobile communication device over said network interface;
      (3) determine that said first GPS location and said second GPS location are in a same facility;
      (4) receive a first visual identification of said first user from said first mobile communication device over said network interface;
      (5) receive a second visual identification of said second user from said second mobile communication device over said network interface;
      (6) send said first visual identification of said first user to said second mobile communication device and said second visual identification of said second user to said first mobile communication device over said network interface;
      (7) after said second visual identification of said second user is sent to said first mobile communication device, receive an invitation for communication with said second user from said first mobile communication device over said network interface;
      (8) forward said invitation to second mobile communication device over said network interface;
      (9) receive an acceptance to said invitation from said second mobile communication device over said network interface;
      (10) forward said acceptance to said first mobile communication device over said network interface;
      (11) maintain a communication session between said first user and said second user, wherein said first mobile communication device does not receive a personal identity of said second user and said second mobile communication device does not receive a personal identity of said first user;
      (12) receive a first message from said first mobile communication device over said network interface;
      (13) forward said first message to said second mobile communication device over said network interface;
      (14) receive a second message from said second mobile communication device over said network interface; and
      (15) forward said second message to said first mobile communication device over said network interface.

2. The system of claim 1, wherein said first message and said second message each are a text message, a photograph, a sound or a video message.

3. The system of claim 1, wherein said server software application is further adapted to perform a policy check to determine whether the communication between said first user and said second user is allowed before forwarding said invitation to second mobile communication device.

4. The system of claim 1, wherein said server software application is further adapted to send said visual identification of said second user to said first mobile communication device.

5. The system of claim 1, wherein said server software application is further adapted to store said visual identification of said first user and said visual identification of said second user into said database.

6. The system of claim 1, wherein said server software application is further adapted to:
 i. receive a third GPS location of said first user over said network interface;
 ii. determine that said third GPS location is out of said facility; and
 iii. terminate said communication session between said first user and said second user.

7. The system of claim 1, wherein said server software application is further adapted to:
 i. from said first communication device, receive a request for terminating said communication session; and
 ii. terminate said communication session between said first user and said second user.

8. The system of claim 1, wherein said visual identification of said first user identifies said first user at said facility and said visual identification of said second user identifies said second user at said facility.

9. The system of claim 8, wherein said visual identification of said first user includes a description of at least one of an eye, a hair, a height, a gender, a clothing, or a position of said first user.

10. The system of claim 8, wherein said visual identification of said second user includes a description of at least one of an eye, a hair, a height, a gender, a clothing, or a position of said second user.

11. A method providing location based one-to-one communication, said one-to-one communication is established using visual identifications of users, the method operating within a server and comprising:
 i. receiving a first Global Positioning System (GPS) location of a first user from a first mobile communication device over a network interface of said server;
 ii. receiving a second GPS location of a second user from a second mobile communication device over said network interface;
 iii. determining that said first GPS location and said second GPS location are in a same facility;
 iv. receiving a first visual identification of said first user from said first mobile communication device over said network interface;
 v. receiving a second visual identification of said second user from said second mobile communication device over said network interface;
 vi. sending said first visual identification of said first user to said second mobile communication device and sending said second visual identification of said second user to said first mobile communication device over said network interface;
 vii. after sending said second visual identification of said second user to said first mobile communication device, receiving an invitation for communication with said second user from said first mobile communication device over said network interface;
 viii. forwarding said invitation to said second mobile communication device over said network interface;
 ix. receiving an acceptance to said invitation from said second mobile communication device over said network interface;
 x. forwarding said acceptance to said first mobile communication device over said network interface;
 xi. maintaining a communication session between said first user and said second user, wherein said first mobile communication device does not receive a personal identity of said second user and said second mobile communication device does not receive a personal identity of said first user;
 xii. receiving a first message from said first mobile communication device over said network interface;
 xiii. forwarding said first message to said second mobile communication device over said network interface;
 xiv. receiving a second message from said second mobile communication device over said network interface; and
 xv. forwarding said second message to said first mobile communication device over said network interface.

12. The method of claim 11, wherein said first message and said second message each are a text message, a photograph, a sound or a video message.

13. The method of claim 11 further comprising performing a policy check to determine whether the communication between said first user and said second user is allowed before forwarding said invitation to second mobile communication device.

14. The method of claim 11 further comprising sending said visual identification of said second user to said first mobile communication device.

15. The method of claim 11 further comprising storing said visual identification of said first user and said visual identification of said second user into a database.

16. The method of claim 11 further comprising:
 i. receiving a third GPS location of said first user over said network interface;
 ii. determining that said third GPS location is out of said facility; and
 iii. terminating said communication session between said first user and said second user.

17. The method of claim 11 further comprising:
 i. from said first communication device, receiving a request for terminating said communication session; and
 ii. terminating said communication session between said first user and said second user.

18. The method of claim 11, wherein said visual identification of said first user identifies said first user at said facility and said visual identification of said second user identifies said second user at said facility.

19. The method of claim 18, wherein said visual identification of said first user includes a description of at least one of an eye, a hair, a height, a gender, a clothing, or a position of said first user.

20. The method of claim 18, wherein said visual identification of said second user includes a description of at least one of an eye, a hair, a height, a gender, a clothing, or a position of said second user.

* * * * *